US008503344B2

(12) United States Patent
Shu et al.

(10) Patent No.: US 8,503,344 B2
(45) Date of Patent: Aug. 6, 2013

(54) NOTIFICATION METHOD, ACCESS POINT, STATION, AND WIRELESS SYSTEM

(75) Inventors: Guiming Shu, Shenzhen (CN); Zhiming Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 298 days.

(21) Appl. No.: 12/987,310

(22) Filed: Jan. 10, 2011

(65) Prior Publication Data

US 2011/0103233 A1    May 5, 2011

Related U.S. Application Data

(63) Continuation of application No. PCT/CN2009/072316, filed on Jun. 17, 2009.

(30) Foreign Application Priority Data

Jul. 11, 2008    (CN) .......................... 2008 1 0116588

(51) Int. Cl.
| | |
|---|---|
| G08C 17/00 | (2006.01) |
| H04L 12/28 | (2006.01) |
| H04L 12/56 | (2011.01) |
| H01Q 11/12 | (2006.01) |
| H04B 1/04 | (2006.01) |

(52) U.S. Cl.
USPC ........... 370/311; 370/216; 370/236; 370/410; 455/127.1; 455/343.5; 455/522

(58) Field of Classification Search
USPC .................. 370/216, 236, 311, 410; 455/522, 455/127.1, 343.5
See application file for complete search history.

(56) References Cited

U.S. PATENT DOCUMENTS

| | | | | |
|---|---|---|---|---|
| 2002/0138775 | A1* | 9/2002 | Hammond et al. | 713/310 |
| 2004/0120263 | A1* | 6/2004 | Kim et al. | 370/252 |
| 2004/0214613 | A1* | 10/2004 | Shin | 455/567 |
| 2004/0224690 | A1* | 11/2004 | Choi et al. | 455/436 |
| 2005/0059422 | A1* | 3/2005 | Rudolf et al. | 455/522 |

(Continued)

FOREIGN PATENT DOCUMENTS

| | | |
|---|---|---|
| CN | 1541021 | 10/2004 |
| CN | 101175004 | 5/2008 |
| JP | 2008-66781 | 3/2008 |
| JP | 2008-131587 | 6/2008 |

OTHER PUBLICATIONS

IEEE P802.11v/D3.0, Draft Standard for Information Technology—Telecommunications and information exchange between systems—Local and metropolitan area networks—Specific requirements—Part 11: Wireless LAN Medium Access Control (MAC) and Physical Layer (PHY) specifications, Amendment 8: Wireless Network Management, IEEE, Jun. 2008, pp. i-xix and 1-254.

(Continued)

Primary Examiner — Benjamin H Elliott, IV
(74) Attorney, Agent, or Firm — Staas & Halsey LLP

(57) ABSTRACT

A notification method, an access point (AP), a station (STA), and a wireless system are disclosed. The notification method includes checking whether a power event occurs, and notifying the power event to an STA if the power event occurs. According to the present invention, the STA can learn about the power event, which helps the STA to decide on the subsequent action according to the power event.

15 Claims, 5 Drawing Sheets

(56) References Cited

U.S. PATENT DOCUMENTS

| | | |
|---|---|---|
| 2006/0153151 A1 | 7/2006 | Huang et al. |
| 2007/0298722 A1* | 12/2007 | Choi ........................ 455/67.11 |
| 2008/0101330 A1 | 5/2008 | Cheng |
| 2011/0103233 A1* | 5/2011 | Shu et al. ..................... 370/241 |

OTHER PUBLICATIONS

Written Opinion of the International Searching Authority, mailed Sep. 24, 2009, in corresponding International Application No. PCT/CN2009/072316 (3 pp.).

Office Action, mailed Jan. 20, 2011, in corresponding Chinese Office Action 200810116588.1 (10 pp.).

Allan Thomson, CISCO Systems, "AP Power Down Notification" IEEE 802.11-08/0759r0, Jul. 15, 2008, pp. 2-20.

European Office Action dated Jul. 5, 2011 in corresponding European Patent Application 09793815.3.

European Office Action dated Nov. 22, 2011 issued in corresponding European Patent Application No. 09793815.3.

Chinese Office Action mailed Feb. 29, 2012 issued in corresponding Chinese Patent Application No. 200810116588.1.

* cited by examiner

NOTIFICATION METHOD, ACCESS POINT, STATION, AND WIRELESS SYSTEM

CROSS-REFERENCE TO RELATED APPLICATIONS

This application is a continuation of International Application No. PCT/CN2009/072316, filed on Jun. 17, 2009, which claims priority to Chinese Patent Application No. 200810116588.1, filed on Jul. 11, 2008, both of which are hereby incorporated by reference in their entireties.

FIELD OF THE INVENTION

The present invention relates to the field of mobile technologies, and in particular, to a notification method, an access point (AP), a station (STA), and a wireless system.

BACKGROUND OF THE INVENTION

IEEE 802.11 is a universal wireless local area network (WLAN) standard. The WLAN system defined in IEEE 802.11 includes a STA and an AP. The STA is a terminal device with a WLAN interface. The AP is equivalent to a base station on a mobile network. Through the AP, one STA can communicate with other STAs or the devices on a cable network. As a wireless network management standard, IEEE 802.11v provides an important and efficient mechanism for simplifying network deployment and management. In the IEEE 802.11v standard, an AP can use an instruction to instruct an STA to send a report when a specific event occurs. For example, for fault diagnosis, an AP can require an STA to generate a report explaining the reason of the handover when the STA is handed over to different APs.

During the implementation of the present invention, the inventor finds that the prior art has at least the following problem: The current event sent by the AP to the associated STA does not include a power event. That is, when the power voltage of the AP is reduced or the AP power is cut, the AP cannot notify this event to its associated STA. As a result, the STA cannot decide on the subsequent action in advance according to the power event.

SUMMARY OF THE INVENTION

Embodiments of the present invention provide a notification method, an AP, an STA, and a wireless system, which helps the AP to notify a power event to the associated STA.

One embodiment of the present invention provides a notification method, which includes:

checking whether a power event occurs, and notifying a power event to an STA if the power event occurs.

One embodiment of the present invention provides an AP, which includes:

a first station management entity (SME), configured to check whether a power event occurs; and a first MAC sublayer management entity (MLME), configured to notify the power event to an STA after the power event occurs.

One embodiment of the present invention provides an STA, which includes:

a second MLME, configured to receive a message carrying power event information from an AP, where the power event information includes a current power voltage and a preset power voltage threshold, or power closure information; and a second SME, configured to make a decision according to the power event information or notify the power event information to other entities.

One embodiment of the present invention provides a wireless system including the AP and the STA.

It can be seen from the preceding technical solution that: according to the embodiments of the present invention, the STA may be notified of a power event immediately after the power event occurs. This helps the STA to decide on a subsequent action according to the power event.

DETAILED DESCRIPTION OF THE EMBODIMENTS

The technical solution of the present invention is hereinafter described in detail with reference to the accompanying drawings and exemplary embodiments.

Figure 1:
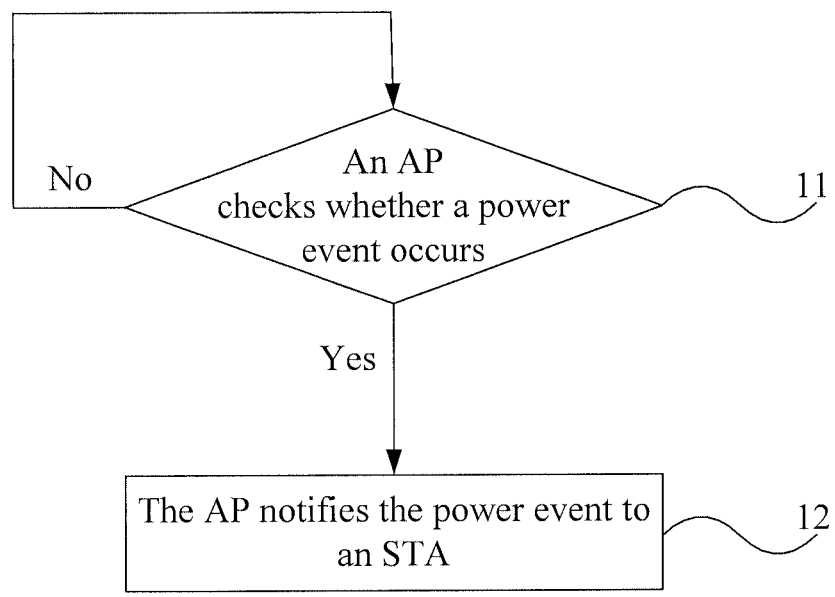
FIG. 1 is a flowchart of a notification method according to a first embodiment of the present invention.

FIG. 1 is the flowchart of a notification method according to the first embodiment of the present invention. The method includes the following blocks:

Block 11: An AP checks whether a power event occurs. If so, block 12 is performed. Otherwise, block 11 is repeated. The power event includes AP power voltage decrease or AP power cut.

Block 12: The AP notifies the power event to an STA.

According to this embodiment, the power event is notified to the STA when the power event occurs, which helps the STA to decide on the subsequent action according to the power event.

Figure 2:
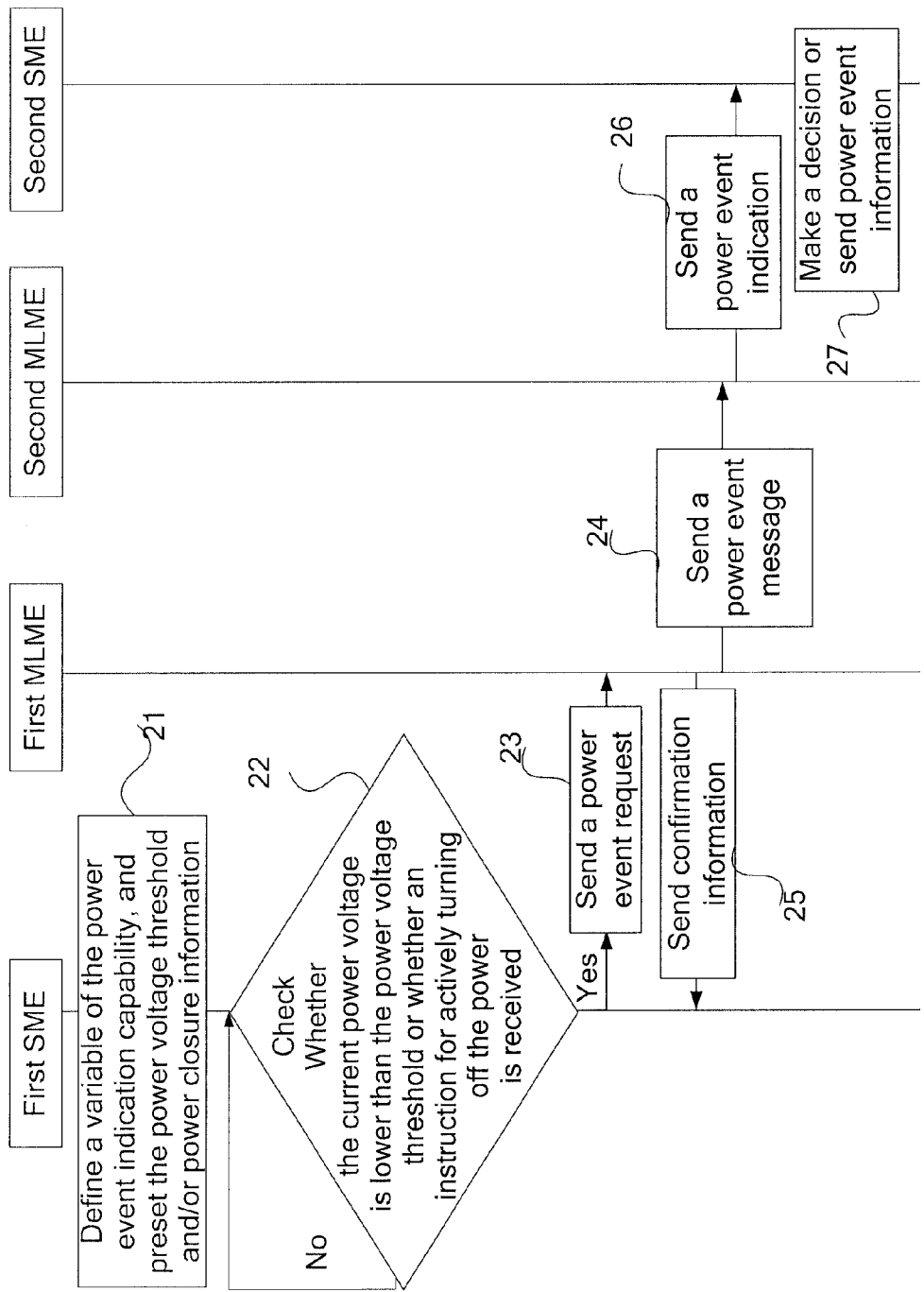
FIG. 2 is a flowchart of a notification method according to a second embodiment of the present invention.

FIG. 2 is the flowchart of a notification method according to the second embodiment of the present invention. The method includes the following blocks:

Block 21: Define a variable of the power event indication capability in an AP, and preset the power voltage threshold and/or power closure information.

For example, a variable of the power event indication capability, such as dot11MgmtOptionPower DownIndicationEnabled, is defined in the management information base (MIB) at the media access control (MAC) layer of the AP. A power voltage threshold such as POWER_DOWN_VOL is set and/or power closure information is set. This information is used to indicate the time when the power is cut off after an instruction for actively cutting off the power is received, or to indicate the urgency degree of cutting off the power. It can be specified that: when the variable dot11MgmtOptionPower DownIndicationEnabled is "1", the AP supports the function of indicating the power event (for example, the power voltage decrease or AP power cut); and when the variable is "0", the AP does not support the function of indicating the power event. The function can be configured by users locally or remotely for the AP.

Before a data frame is transmitted between the STA and the AP, the STA and the AP need to be scanned, authenticated, and associated. The scan process includes STA active scan and STA passive scan. When the active scan is performed, the STA sends a probe request frame to the AP, and the AP returns a probe response frame to the STA. When passive scan is performed, the AP sends a beacon frame to the STA. Therefore, to broadcast its supported power event indication capability to the STA, the AP can notify the STA that it supports the function of indicating the power event through one of the capability information fields defined in the beacon frame in the 802.11 standard; or the AP notifies the STA that it supports the function of indicating the power event in a probe response frame upon receiving the probe request frame from the STA.

Block 22: A first Station Management Entity (SME) in the AP checks whether the current power voltage is lower than the preset power voltage threshold or whether an instruction for actively cutting off the power is received. If so, block 23 is performed; otherwise, block 22 is continued. The instruction for cutting off the power is generated locally or is sent by a remote network entity.

Block 23: The first SME sends a power event request to a first MAC subLayer Management Entity (MLME) in the AP. The power event request carries power event information which includes the current power voltage and the preset power voltage threshold, or power closure information.

The power event request MLME-PWDOWNINDICATION.Request is defined as follows:

MLME-PWDOWNINDICATION.Request
(Peer MAC Address
   Dialog Token
   Power Threshold, optional
   Current Power Voltage, optional
   Power Closure Information, optional
)

If the power event indicates whether the current power voltage is lower than the preset power voltage threshold, the power voltage threshold and the current power voltage are included in the event. If the power event indicates that the instruction for actively cutting off the power is received, power closure information is included in the event.

The power event information further includes other auxiliary decision information which helps the STA to decide on the subsequent action, such as the delay for cutting off the power and other AP information which is selectable in the current area.

Block 24: The first MLME sends (broadcasts, multicasts, or unicasts) a power event message to a second MLME of the currently-associated STA. The power event message carries power event information.

Block 25: The first MLME returns a power event confirmation information to the first SME to help the first SME to learn about whether the power event message is sent successfully.

The power event confirmation information MLME-PWDOWNINDICATION.Confirm is defined as follows:

MLME-PWDOWNINDICATION.Request
(Dialog Token
   Result Code
)

Block 26: Upon receiving the power event message, the second MLME sends a power event indication to the second SME in the STA. The power event indication carries the power event information. The power event information includes the current power voltage and the power voltage threshold, or power closure information, and may further include auxiliary decision information.

The power event indication MLME-PWDOWNINDICATION.Indication is defined as follows:

MLME-PWDOWNINDICATION.Indication
(Peer MAC Address
   Dialog Token
   Power Threshold, optional
   Current Power Voltage, optional
   Power Closure Information, optional
)

If the power event indicates whether the current power voltage is lower than the preset power voltage threshold, the power voltage threshold and the current power voltage are included in the event. If the power event indicates that an instruction for actively cutting off the power is received, power closure information is included in the event.

Block 27: The second SME decides on the subsequent action according to the power event information carried in the power event indication, for example, AP handover, or sends the power event information to other entities.

According to this embodiment, the power event is notified to the STA through a new message, which helps the STA to make the corresponding decision according to the power event information carried in the power event indication.

Figure 3:
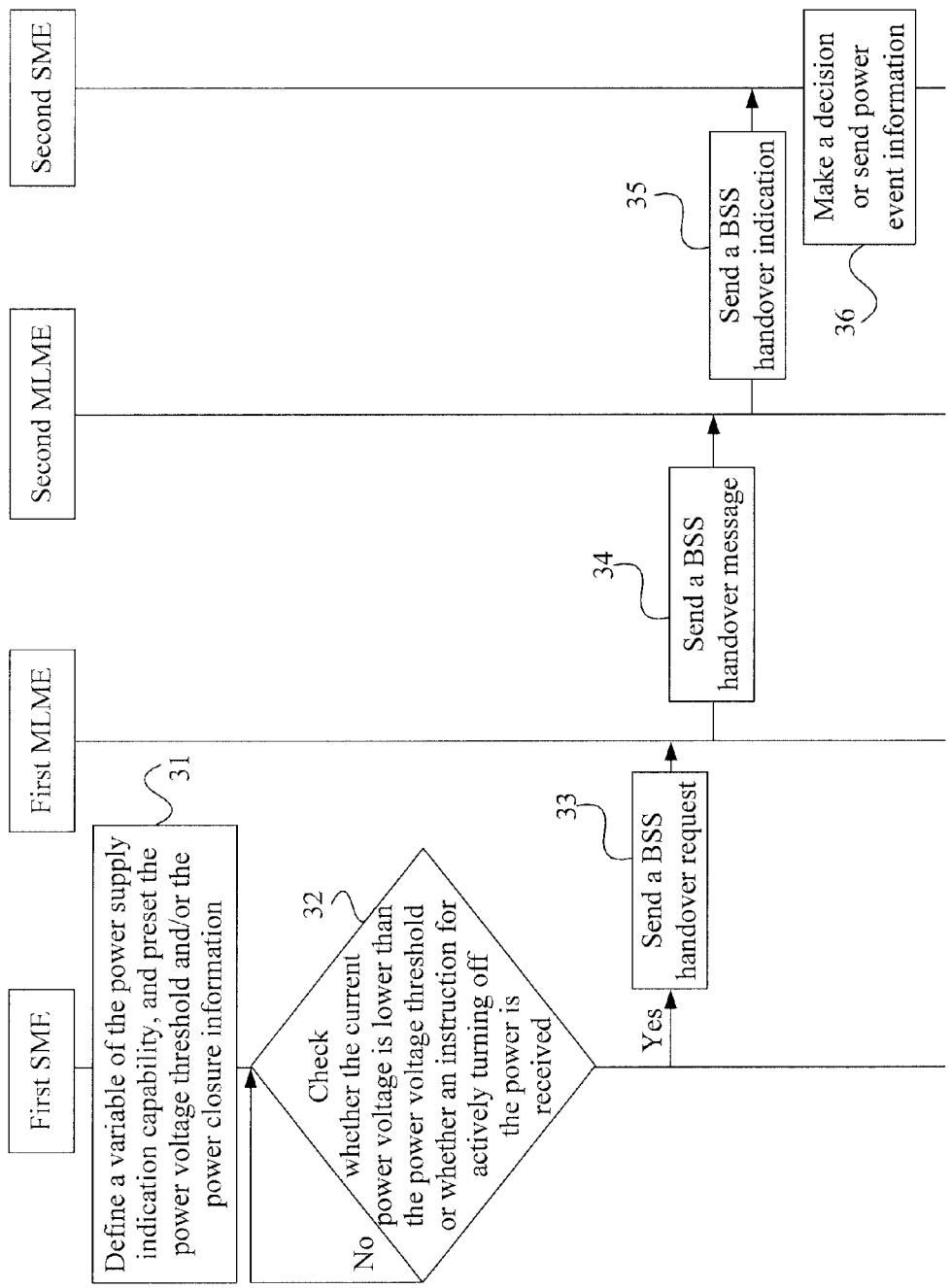
FIG. 3 is a flowchart of a notification method according to a third embodiment of the present invention.

FIG. 3 is the flowchart of a notification method according to the third embodiment of the present invention. The method includes the following blocks:

Block 31: Define a variable of the power event indication capability in an AP, and preset the power voltage threshold and/or the power closure information. The detailed procedure is provided in the preceding embodiment, where the variable is notified to an STA through an extension of the existing message.

Block 32: A first SME in the AP checks whether the current power voltage is lower than the preset power voltage threshold or whether an instruction for actively cutting off the power is received. If so, block 33 is performed; otherwise, block 32 is continued. The instruction for cutting off the power is generated locally or is sent by a remote network entity.

Block 33: A first SME sends a basic service set (BSS) handover request to a first MLME in the AP. The BSS handover request carries the power event information which includes the current power voltage and the preset power voltage threshold, or power closure information.

The BSS handover request (MLME-BTM.Request) is the BSS handover request sent from the SME in the AP in the 802.11v standard to the MLME. The definition is as follows:

```
    MLME-BTM.Request
    (Peer MAC Address
       Dialog token
       RequestMode
       Disassociation Timer
       BSS Transition Candidate List
    )
```

The BSS handover request needs to be extended to carry the power event information. The extended BSS handover request is defined as follows:

```
    MLME-BTM.Request
    (Peer MAC Address
       Dialog Token
       RequestMode
       Disassociation Timer
       BSS Transition Candidate List
       Power Threshold, optional
       Current Power Voltage, optional
       Power Closure Information, optional
    )
```

If the power event indicates whether the current power voltage is lower than the preset power voltage threshold, the power voltage threshold and the current power voltage are included in the event. If the power event indicates that the instruction for actively cutting off the power is received, power closure information is included in the event.

The power event message further includes other auxiliary decision information, which helps the STA to decide on the subsequent action, such as the delay for cutting off the power and other AP information which is selectable in the current area.

Block 34: The first MLME sends (broadcasts, multicasts, or unicasts) a BSS handover message to a second MLME of the currently-associated STA. The BSS handover message carries the power event information.

The BSS handover message (BSS Transition Management Request) is a handover message sent to the STA through the air interface after the MAC layer of the AP in the current 802.11v standard receives the BSS handover request from the SME through the MLME. The BSS handover message includes the information associated with the BSS handover request.

The BSS handover message needs to be extended to carry the power event information, which includes the current power voltage and the power voltage threshold, or power closure information, and may further include auxiliary decision information such as the delay for cutting off the power and other AP information which is selectable in the current area.

Block 35: Upon receiving the BSS handover message, the second MLME sends a BSS handover indication to the second SME in the STA. The BSS handover indication carries the power event information.

The BSS handover indication (MLME-BTM.Indication) is an indication sent to the SME through the MLME after the MAC layer used in the STA in the 802.11v standard receives the BSS handover message sent from the AP. The definition is as follows:

```
    MLME-BTM.Indication
    (ResultCode//SUCCESS indicates that the request is initiated by the AP
       Peer MAC Address
       Dialog Token
       RequestMode
       Disassociation Timer
       BSS Transition Candidate List
    )
```

The BSS handover indication needs to be extended to carry the power event information. The extended BSS handover indication is defined as follows:

```
    MLME-BTM.Indication
    (ResultCode//SUCCESS indicates that the request is initiated by the AP
       Peer MAC Address
       Dialog Token
       RequestMode
       Disassociation Timer
       BSS Transition Candidate List
       Power Threshold, optional
       Current Power Voltage, optional
       Power Closure Information, optional
    )
```

If the power event indicates whether the current power voltage is lower than the preset power voltage threshold, the power voltage threshold and the current power voltage are included in the event. If the power event indicates that an instruction for actively cutting off the power is received, power closure information is included in the event.

The RequestMode parameter in the BSS handover request and/or the BSS handover indication is defined as follows: The parameter occupies one byte; bit 0 indicates whether the candidate AP list is included in the frame; bit 1 indicates whether all available APs are included; bit 2 indicates whether the AP will disassociate from the STA, and bits 3-7 are reserved.

In this embodiment, because certain bits are reserved for the RequestMode parameter, one (such as bit 3) or multiple bits of the reserved bits (bits 3-7) can be used to indicate that a power event occurs.

Block 36: The second SME decides on the subsequent action according to the power event information carried in the BSS handover indication or sends the power event information, for example, AP handover, to other entities.

According to this embodiment, a proper message defined in the current 802.11 standard is used to transmit the power event and the existing message is extended to notify the power event to the STA, which helps the STA to decide on the subsequent action according to the power event.

Persons of ordinary skill in the art may understand that all or part of blocks according to the embodiments of the present invention may be implemented by a program instructing relevant hardware. The program may be stored in a computer readable storage medium. When the program runs, the blocks of the method in the embodiments are executed. The storage medium may be a read only memory (ROM), a random access memory (RAM), a magnetic disk or a compact disk-read only memory (CD-ROM), which can store program codes.

Figure 4:
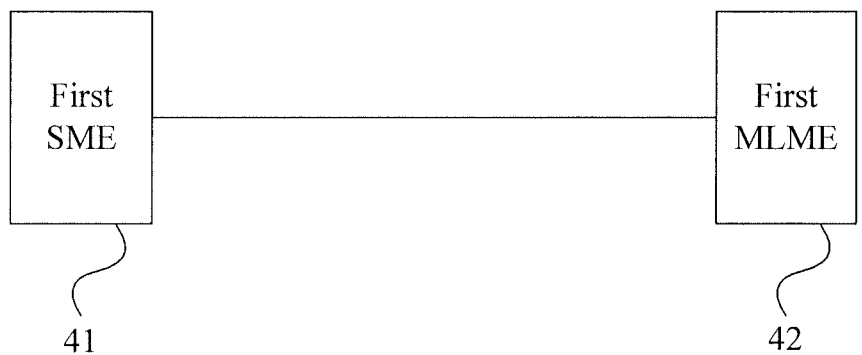
FIG. 4 is a structural diagram of an AP according to a first embodiment of the present invention.

FIG. 4 is a structural diagram of an AP according to the first embodiment of the present invention. The AP includes a first SME 41 and a first MLME 42. The first SME 41 is configured to check whether a power event occurs. The first MLME 42 is configured to notify the power event to an STA after the power event occurs.

According to this embodiment, the STA can be notified of the power event after the power event occurs in the AP, which helps the STA to decide on the subsequent action according to the power event.

Figure 5:
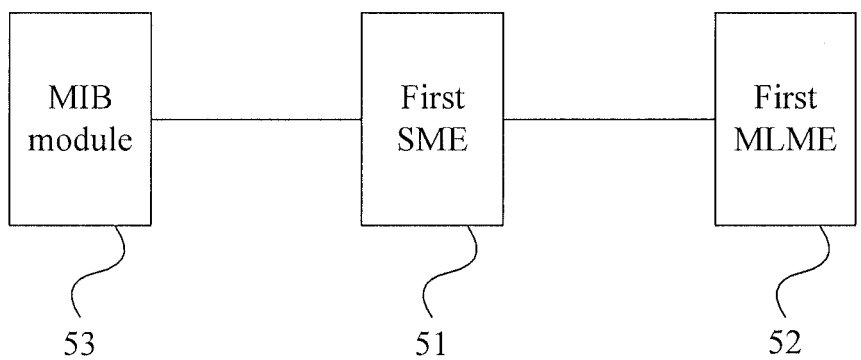
FIG. 5 is a structural diagram of an AP according to a second embodiment of the present invention.

FIG. 5 is a structural diagram of the AP according to the second embodiment of the present invention. The AP includes a first SME 51, a first MLME 52, and a MIB module 53.

The MIB module 53 is configured to define a variable of power event indication capability, and preset a power voltage threshold and/or power closure information. The variable of power event indication capability is used to indicate the power event indication capability of the AP.

The first SME 51 is connected to the MIB module 53 and the first MLME 52, and configured to send a power event indication to the first MLME 52 after detecting that the current power voltage is lower than the preset power voltage threshold or receiving an instruction for actively cutting off the power. The power event indication carries power event information. The power event information includes the current power voltage and the preset power voltage threshold, or power closure information, and may further include auxiliary decision information such as the delay for cutting off the power and other AP information which is selectable in the current area. The instruction for cutting off the power is generated locally or sent by a remote network entity.

The first MLME 52 is configured to send the power event message to an STA upon receiving the power event indication. The first MLME 52 is further configured to return confirmation information to the first SME 51 upon receiving the power event request.

Or, the first SME 51 is configured to send a BSS handover request to the first MLME 52 after detecting that the current power voltage is lower than the preset power voltage threshold or receiving an instruction for actively cutting off the power. The BSS handover request carries power event information. The power event information includes the current power voltage and the preset power voltage threshold, or power closure information. The instruction for cutting off the power is generated locally or sent by a remote network entity.

The first MLME 52 is configured to send a BSS handover message to the STA upon receiving the BSS handover request. The BSS handover message carries the power event information.

According to this embodiment, the AP is preset so that it has the power indication capability. This indicates the internal interaction of the AP and the procedure for sending a message to the STA when the power event occurs.

Figure 6:
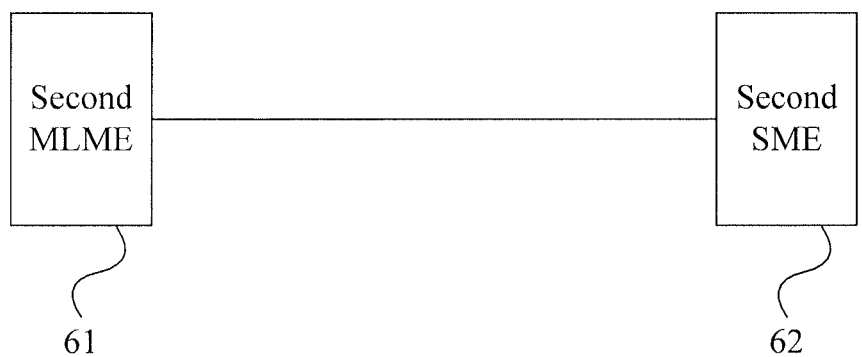
FIG. 6 is a structural diagram of an STA according to one embodiment of the present invention.

FIG. 6 is a structural diagram of an STA according to one embodiment of the present invention. The STA includes a second MLME 61 and a second SME 62. The second MLME 61 is configured to receive a message carrying the power event information from an AP. The power event information includes the current power voltage and the preset power voltage threshold, or power closure information, and may further include auxiliary decision information. The message is a new message, such as the power event message or the existing message (for example, a BSS handover message). The second SME 62 is configured to: receive an indication carrying the power event information from the second MLME 61, and decide on the subsequent action according to the power event information or send the power event information to other entities. Corresponding to the message received by the first MLME, the indication is a power event indication or a BSS handover indication. According to this embodiment, the power event can be received so that a decision is made according to the power event.

Figure 7:
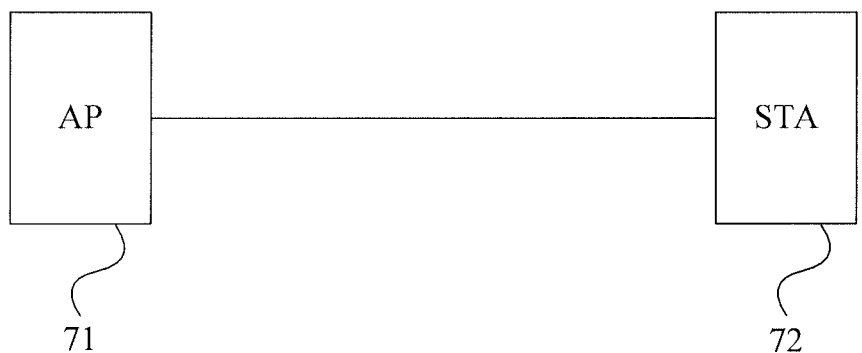
FIG. 7 is a structural diagram of a wireless system according to one embodiment of the present invention.

FIG. 7 is a structural diagram of a wireless system according to one embodiment of the present invention. The wireless system described in this embodiment includes the AP 71 shown in FIG. 5 or FIG. 6 and the STA 72 shown in FIG. 6.

According to this embodiment, the STA can be notified of the power event after a power event occurs in the AP, which helps the STA to decide on the subsequent action according to the power event.

It should be noted that the preceding embodiments are intended to describe the technical solution of the present invention only, other than to limit the present invention. Although the present invention is described in detail by referring to the exemplary embodiments, those skilled in the art should understand that various modifications or equivalent replacements can be made according to the embodiments of the present invention. Such modifications and equivalent replacements fall into the principle and scope of the invention.

What is claimed is:

1. A notification method, comprising:
checking whether a power event occurs; and
notifying the power event to a station (STA) through a new message or through an extension of an existing message if the power event occurs,
wherein the notifying the power event to the STA through the extension of the existing message comprises:
when detecting that a current power voltage is lower than a preset power voltage threshold or receiving an instruction for actively cutting off power, sending a basic service set (BSS) handover message to the STA, wherein the BSS handover message carries power event information comprising the current power voltage and the preset power voltage threshold, or power closure information.

2. The method according to claim 1, wherein checking whether the power event occurs comprises:
checking whether a current power voltage is lower than a preset power voltage threshold or whether an instruction for actively cutting off the power is received, wherein the current power voltage being lower than the preset power voltage threshold or the instruction for actively cutting off the power being received thereby indicates that the power event occurs.

3. The method according to claim 2, wherein the instruction for actively cutting off the power is generated locally or sent by a remote network entity.

4. The method according to claim 1, wherein the notifying the power event to the STA through the new message comprises:
when detecting that a current power voltage is lower than a preset power voltage threshold or receiving an instruction for actively cutting off the power, sending a power event message to the STA, wherein the power event message carries power event information comprising the current power voltage and the preset power voltage threshold, or power closure information.

5. The method according to claim 4, further comprising:
notifying a power event indication capability through a capability information field carried in a beacon frame or a probe response frame.

6. The method according to claim 4, wherein the power event information further comprises auxiliary decision information that comprises a delay of cutting off the power, and/or information of a selectable access point (AP) in a current area.

7. The method according to claim 1, further comprising: notifying the power event indication capability through a capability information field carried a beacon frame or a probe response frame.

8. The method according to claim 1, further comprising: indicating that the power event occurs by using a Request-Mode parameter in the BSS handover request, in a BSS handover message, and in a BSS handover instruction.

9. The method according to claim 1, wherein the power event information further comprises auxiliary decision information that comprises a delay of cutting off the power, and/or information of a selectable access point (AP) in a current area.

10. An access point (AP), comprising:
- a first station management entity (SME), configured to check whether a power event occurs; and
- a first media access control (MAC) sublayer management entity (MLME), configured to notify the power event to a station (STA) after the power event occurs, wherein the first SME and the first MLME are configured as one of the group including:
  - a configuration where
    - the first SME is configured to send a power event request to the first MLME upon detecting that a current power voltage is lower than a preset power voltage threshold or receiving an instruction for actively cutting off power, wherein the power event request carries power event information comprising the current power voltage and the preset power voltage threshold, or power closure information, and
    - the first MLME is configured to send a power event message to the STA upon receiving the power event request, wherein the power event message carries the power event information, and
  - a configuration where
    - the first SME is configured to send a basic service set (BSS) handover request to the first MLME when detecting that the current power voltage is lower than the preset power voltage threshold or receiving an instruction for cutting off the power, wherein the BSS handover request carries power event information comprising the current power voltage and the preset power voltage threshold, or power closure information, and
    - the first MIME is configured to send a BSS handover message to the STA upon receiving the BSS handover request, wherein the BSS handover message carries the power event information.

11. The AP according to claim 10, further comprising:
a management information base (MIB) module, configured to store a pre-defined variable of power event indication capability, and store a preset power voltage threshold and/or preset power closure information, wherein the variable of the power event indication capability is configured to indicate the power event indication capability of the AP.

12. The AP according to claim 10, wherein:
the first MLME is further configured to return confirmation information to the first SME upon receiving the power event request.

13. The AP according to claim 10, wherein the first SME and the first MLME are configured as the configuration where
- the first SME is configured to send a power event request to the first MLME upon detecting that a current power voltage is lower than a preset power voltage threshold or receiving an instruction for actively cutting off the power, wherein the power event request carries power event information comprising the current power voltage and the preset power voltage threshold, or power closure information, and
- the first MLME is configured to send a power event message to the STA upon receiving the power event request, wherein the power event message carries the power event information.

14. The AP according to claim 10, wherein the first SME and the first MLME are configured as the configuration where
- the first SME is configured to send a basic service set (BSS) handover request to the first MLME when detecting that the current power voltage is lower than the preset power voltage threshold or receiving an instruction for cutting off the power, wherein the BSS handover request carries power event information comprising the current power voltage and the preset power voltage threshold, or power closure information, and
- the first MLME is configured to send a BSS handover message to the STA upon receiving the BSS handover request, wherein the BSS handover message carries the power event information.

15. A method comprising:
checking whether a power event occurs; and
notifying the power event to a station (STA) through an extension of an existing message if the power event occurs by, when detecting that a current power voltage is lower than a preset power voltage threshold or receiving an instruction for actively cutting off the power, sending a basic service set (BSS) handover message to the STA, wherein the BSS handover message carries power event information comprising the current power voltage and the preset power voltage threshold, or power closure information.

* * * * *

UNITED STATES PATENT AND TRADEMARK OFFICE
CERTIFICATE OF CORRECTION

PATENT NO.        : 8,503,344 B2                                   Page 1 of 1
APPLICATION NO.   : 12/987310
DATED             : August 6, 2013
INVENTOR(S)       : Shu et al.

It is certified that error appears in the above-identified patent and that said Letters Patent is hereby corrected as shown below:

In the Claims

Column 9, Line 45, in Claim 10, delete "MIME" and insert -- MLME --, therefor.

Signed and Sealed this
Twenty-ninth Day of July, 2014

Michelle K. Lee
*Deputy Director of the United States Patent and Trademark Office*